March 6, 1956  W. C. TRIPP  2,736,993
ABRADING APPARATUS
Filed March 25, 1953  2 Sheets-Sheet 1
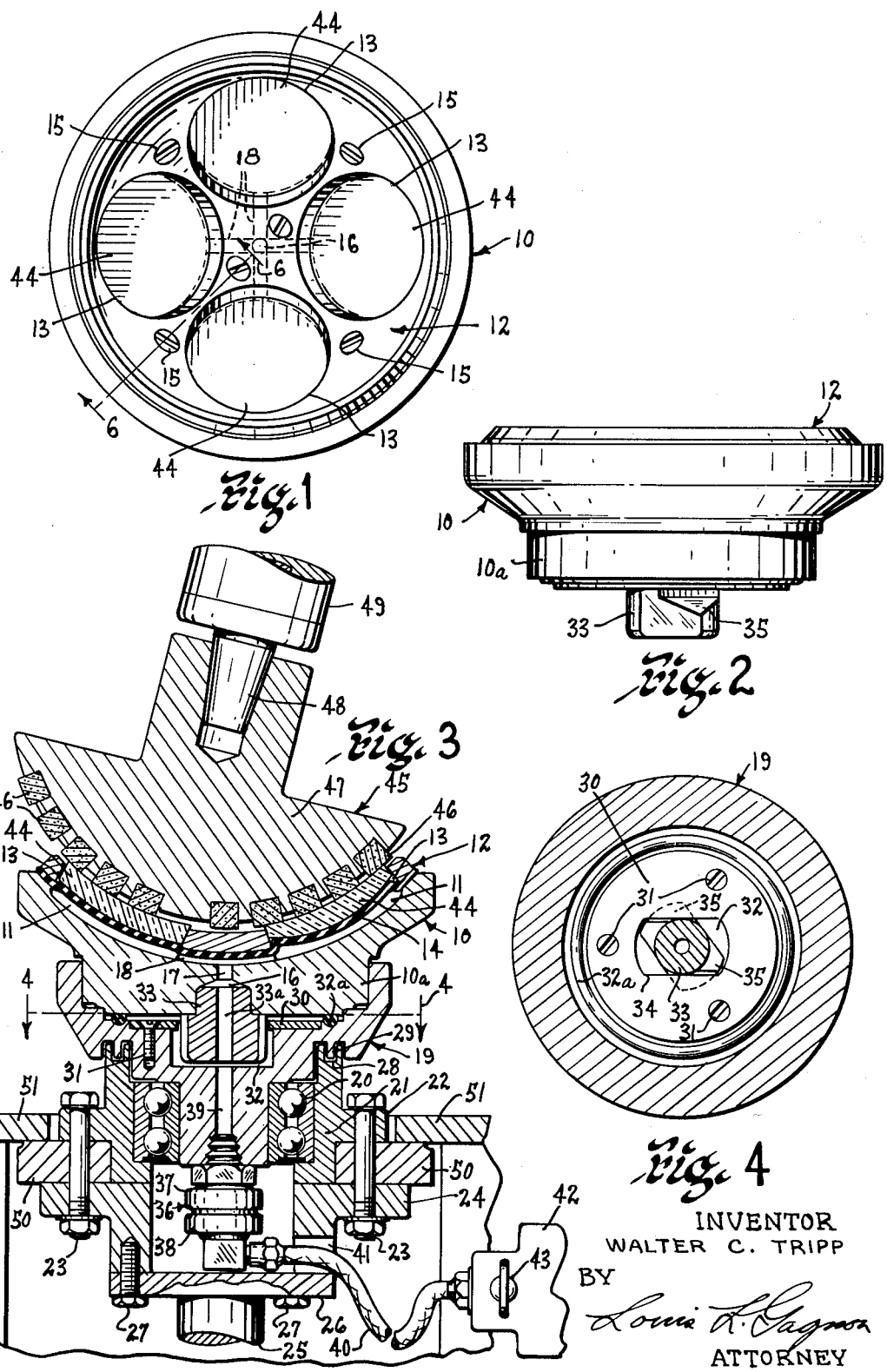
INVENTOR
WALTER C. TRIPP
BY
Louis L. Gagnon
ATTORNEY March 6, 1956     W. C. TRIPP     2,736,993
ABRADING APPARATUS
Filed March 25, 1953     2 Sheets-Sheet 2
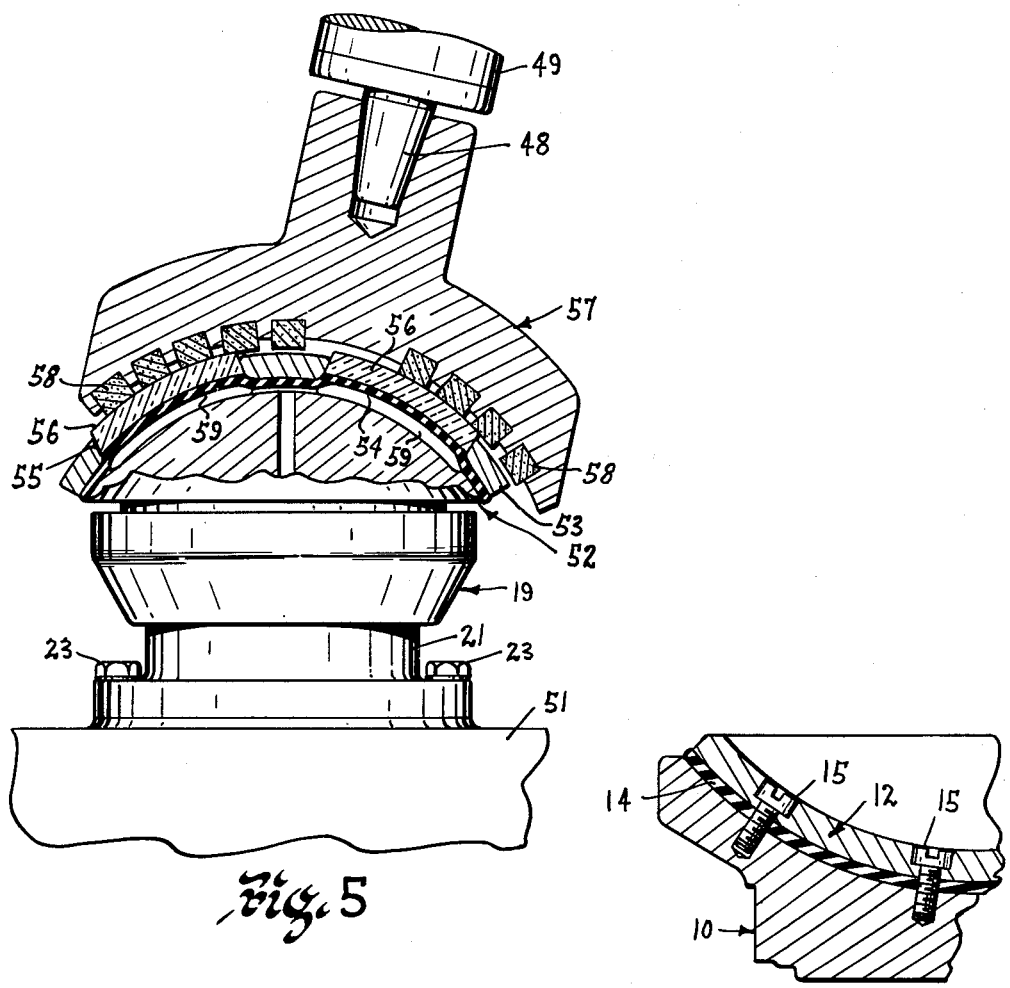
Fig. 5
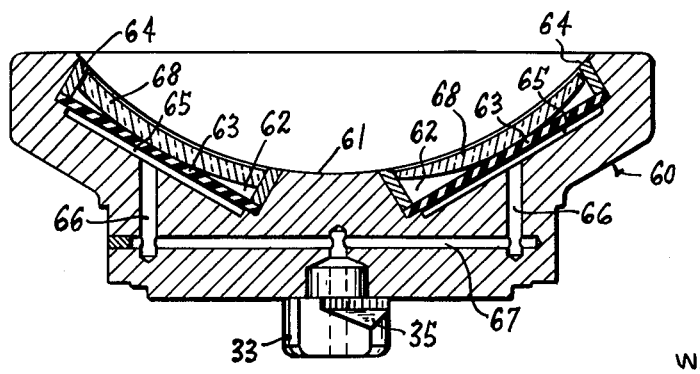
Fig. 6
Fig. 7
INVENTOR
WALTER C. TRIPP
BY
Louis R. Gagnon
ATTORNEY United States Patent Office 2,736,993
Patented Mar. 6, 1956

2,736,993

ABRADING APPARATUS

Walter C. Tripp, Charlton, Mass., assignor to American Optical Company, Southbridge, Mass., a voluntary association of Massachusetts Application March 25, 1953, Serial No. 344,486

5 Claims. (Cl. 51—131)

This invention relates to abrading apparatus and has particular reference to an improved device for holding work during the abrading thereof and method of using same.

The prior art teaches various means and methods of supporting articles such as lens blanks during the abrading thereof such as by using an adhesive for relatively rigid attachment of the blanks to a relatively rigid supporting block and subsequently feeding an abrading tool into the blanks so supported for a controlled distance in accordance with the amount of material to be removed from the surface of the blank or blanks. Another prior art method teaches the use of a relatively light supporting block or holder containing a separable hydrostatic cushion against which the work rests during an abrading operation.

In all known prior art methods, however, it is necessary to employ relatively complicated mechanical mechanism for feeding the abrading tool into the work in order that the work may be surfaced as desired.

Therefore, it is one of the principal objects of this invention to overcome the above and other objections to the prior art by providing improved means and method for blocking articles such as lens blanks for abrasion by an abrading tool and causing relative movement of said articles and tool whereby the articles will be abraded as desired.

Another object is to provide a lens blocking device of the above character wherein the articles are positioned upon resilient means which is adapted, during an abrading operation, to urge the articles in a direction toward the tool for abrasion thereby.

Another object is to provide a lens blocking device embodying a diaphragm upon which the articles are adapted to be positioned, and hydrostatic means, preferably pneumatic, for urging the articles in a direction toward the abrading tool.

Another object is to provide improved means and method of the above character wherein said articles are supported upon said diaphragm and in engagement with the abrading tool and, through the action of pneumatic pressure upon the diaphragm, the diaphragm will apply pressure substantially uniformly throughout the articles to urge them in a direction toward the abrading tool for a controlled time-pressure cycle whereby the articles will be abraded to a predetermined depth.

Other objects and advantages will become apparent from the following description taken in connection with the accompanying drawings, wherein:

Fig. 1 is a plan view of a lens block embodying the invention;

Fig. 2 is a side elevational view of the block shown in Fig. 1;

Fig. 3 is a vertical sectional view taken through a lens block and work-supporting device embodying the invention;

Fig. 4 is a horizontal sectional view taken substantially on line 4—4 of Fig. 3 looking in the direction indicated by the arrows;

Fig. 5 is a fragmentary side elevational view partly in section of a modification of the device shown in Fig. 3;

Fig. 6 is an enlarged sectional view taken substantially on line 6—6 of Fig. 1 looking in the direction indicated by the arrows; and Fig. 7 is a vertical sectional view through a modified form of block.

Referring more particularly to the drawings wherein like characters of reference designate like parts throughout the several views, the present invention comprises, in its preferred embodiment as shown in Figs. 1, 2 and 3, a concave chuck or holder 10 having a plurality of shallow cavities 11 (Fig. 3) in the face thereof.

Overlying the face of the holder 10 is a cage 12 which is shaped to fit thereon with a plurality of openings 13 aligned with the cavities 11. Disposed between the adjacent surfaces of the holder 10 and cage 12 is a diaphragm 14 of pliable non-foraminous material such as rubber. The cage 12 and rubber diaphragm 14 are secured to the face of the holder 10 by means of screws 15 with the diaphragm 14 in its normal state being firmly held between the adjacent surfaces in the areas where the surfaces meet and being spaced above the bottoms of the cavities 11 at a distance substantially equal to the depth of the cavities 11.

A recess 16 is formed in the under side of the holder 10 and leading upwardly therefrom is a central bore 17. A plurality of grooves 18 are formed in the central area of the holder 10 and extend radially from the bore 17 to permit communication with each of the cavities 11.

The holder 10 has a lower portion 10a which is positioned in the recessed upper side of an adapter 19 which is mounted as by ball bearings 20 in a supporting ring 21. The supporting ring 21 is provided with a peripheral flange 22 which has attached thereto, as by bolts 23, an annular member 24. A lower or work-supporting spindle 25 has fixedly secured to its upper end a plate 26 which is attached as by screws 27 or the like to the lower end of the annular member 24.

The upper end of the supporting ring 21 is provided with a continuous annular groove 28 in which is disposed an annular loosely interfitting lip 29 formed on the under side of the adapter 19. Thus, the adapter 19 and holder 10 mounted thereon are adapted to freely revolve on bearings 20 without any substantial amount of undesirable lateral displacement with the interfitting lip 29 and groove 28 functioning to prevent entrance of foreign matter to the bearings 20.

The inner upper surface of the adapter 19 has a disc or plate 30 secured thereto as by screws 31, which plate 30 overlies a central recess 32 in the adapter 19. In the recess 16 in the under side of the holder 10 is fixed a cam lock 33 which is provided therethrough with a vertical bore 33a and which is adapted to be inserted in the recess 32 through an opening 34 (Fig. 4) in the plate 30. When the cam lock 33 is located in the recess 32 the holder is rotated to cause the cam surfaces 35 of the cam lock 33 to slide beneath portions of the plate 30 to hold the holder 10 in assembled relation with the adapter 19.

The lower end of the adapter 19 has a threaded opening for receiving a rotary joint 36 which is so constructed that the upper end 37 thereof which is attached to the adapter 19 is free to rotate therewith while the lower end 38 thereof is independently rotatable. A bore 39 extends through the adapter 19 to permit communication between the recess 32 and the joint 36. A flexible conduit 40 has one end suitably connected to the lower end of the joint 36 and extends through an opening 41 in the annular member 24 to a tank or compressor 42 or the like to which it is connected. By manual operation of suitable control means such as a valve 43 the operator of the device can control a flow of air or other suitable fluid from the tank or compressor 42 into the joint 36 and thence through bore 39, recess 32, bore 33a, recess 16, and bore 17 into the grooves 18 leading to the cavities 11. A ring-like gasket 32a formed of rubber or the like is located between the holder 10 and adjacent surface of the adapter 19 to prevent the fluid from escaping.

In using the device, articles such as lens blanks 44 are disposed in the openings 13 in the cage 12 with their lower surfaces resting upon the diaphragm 14. When air or other fluid is inserted under pressure into the cavities 11, the diaphragm 14 will be forced into snug interfitting engagement with the adjacent surfaces of the lens blanks 44 as shown in Fig. 3. This pressure will cause the lens blanks 44 to be uniformly urged in a direction outwardly of the openings 13 toward an abrading tool 45.

The abrading tool 45 is provided with a polishing or abrading surface preferably formed as a plurality of spaced abrading members 46 which are mounted in the surface of the main portion 47 of the tool and which are provided with curved abrading surfaces complementary to the curvature of the surfaces to be abraded. The tool 45 is suitably mounted on the shank 48 of a spindle 49 which is rotated, to rotate the tool 45, by any suitable means, not shown, as is well known.

For details of a complete machine to which the present invention is applicable reference is hereby made to my copending U. S. patent application Serial No. 308,889, filed September 10, 1952.

In the presently described invention the tool 45, while rotatable, is not movable longitudinally toward or away from the work. However, the work spindle 25 is longitudinally movable by means such as described in the above-mentioned copending patent application. Stop means in the form of an annular collar or ring 50 is secured between the annular member 24 and the flange 22 on the supporting ring 21 by the bolts 23. The ring 50 is adapted to engage suitable stops 51 provided on any suitable fixed portion of the machine to limit the extent of upward movement of the work spindle 25. Thus, when the ring 50 engages the stops 51 the surface of the cage 12 carried by the holder 10 will be spaced slightly from the abrading surfaces of the abrading members 46 of tool 45. Then application of air or other type of fluid pressure to the device as described above will cause the diaphragm 14 to be urged into intimate engagement with the adjacent surfaces of the lens blanks 44 and to become superimposed closely thereagainst regardless of the shapes or curvatures of said surfaces. This will cause the pressure to be uniformly distributed throughout the surfaces of the lens blanks 44 and will cause the blanks 44 to be independently and uniformly moved into engagement with the abrading members 46 of the tool 45. The pressure, of course, may be controlled by the valve means 43, or other suitable means, whereby the force applied to the lens blanks 44 may be varied as desired throughout a range such, for example, as to cause the blanks 44 to lightly engage the tool or to bear heavily thereagainst. Such pressure control will consequently allow for controlled rate of removal of material from the lens blanks 44 during the abrading operation.

Thus, it will be understood that the extent of removal of material from the surfaces of the lens blanks 44 can be easily controlled by means of a known time-pressure cycle and prior knowledge of the abrading characteristics of the abrading members 46 and speed of rotation of the tool 45.

It is to be understood that although the foregoing description refers primarily to means and method of forming negative or concave curved surfaces on the selected articles, it is to be understood that plus or convex curved surfaces can be similarly formed by providing a convexly shaped holder 52 as shown in Fig. 5 rather than the concave holder shown in Fig. 3. Such a convex holder 52 will be provided with a convex cage 53, a diaphragm 54, and cavities 55 for receiving so-called "plus" lens blanks 56. The tool 57, of course, is also shaped to have a complementary concave surface carrying abrading members 58 with minus curved abrading surfaces. Such a device will readily form accurate plus curved surfaces on the lens blanks 56 when the blanks 56 are urged into engagement with the rotating tool 57 by the application of fluid to the recesses 59 beneath the diaphragm in a manner similar to the minus curve device.

A modified device is shown in Fig. 7 and embodies a one-piece holder and cage combination 60 wherein the upper surface 61 thereof is provided with a plurality of cavities 62 each of which has an individual diaphragm 63 positioned therein. The diaphragms 63 are held in place by retaining rings 64. Beneath each diaphragm is a recess 65 which is of a size preferably corresponding with the inner dimensions of the retaining rings 64. Each recess 65 has a separate convector 66 which communicates with a main convector 67 leading to the bore 17 of the holder and through which the fluid is transmitted to the recesses 65. Such a device will function in a manner similar to the preferred construction shown in Fig. 3 whereby the diaphragms 63 will fit upon the adjacent surfaces of lens blanks 68 in the cavities 62 and will provide substantially uniform pressure thereagainst to urge the lens blanks 68 toward an abrading tool.

From the foregoing it is obvious that a work holding device is provided in accordance with the objects and advantages of this invention and that the device is a decided improvement over the known prior art.

It will also be apparent that changes may be made in the details of construction and arrangement of parts shown and described without departing from the spirit of the invention as expressed in the accompanying claims. Therefore, it is to be understood that all matter set forth or shown in the accompanying drawings is to be interpreted as illustrative and not in a limiting sense.

I claim:

1. In abrading apparatus for holding and for substantially uniformly abrading work of a given size and shape comprising a pair of spindles, one being movable toward the other, an abrading member carried by one of said spindles, a work holding member carried by the other of said spindles, means for rotating one of said members relative to the other, said work holding member having an opening in the upper surface thereof of a size and shape to receive the work to be supported therein, said opening having a cavity communicating therewith, a resilient diaphragm spanning said opening in overlying relation with the cavity and being sealed throughout the periphery thereof with the work supporting member thereby providing a sealed chamber between said diaphragm and cavity, fluid pressure control means, conduit means connecting said sealed chamber with said fluid pressure control means, said work to be abraded being adapted to be supported in said opening with its inner surface adjacent the diaphragm, means for locating the effective abrading surface of the abrading member and the adjacent surface of the work supporting member in controlled spaced relation with each other and means for regulating the rate and extent of flow of fluid from said fluid pressure control means to said chamber beneath the diaphragm to cause said diaphragm to exert a substantially uniform pressure of said work on said abrading tool to, in turn, control the rate and extent of removal of material from said work by said abrading tool throughout a given cycle of abrasion.

2. In abrading apparatus for holding and for substantially uniformly abrading work of given size and shape comprising a pair of spindles, one being movable toward the other, one of said spindles having an abrading tool member attached thereto and the other having a work supporting member attached thereto, means for rotating one of said members relative to the other, said work supporting member having a plurality of openings in the upper surface portion thereof each of a size and shape to receive the work and each having a cavity associated therewith, resilient diaphragm means spanning said openings in overlying relation with said cavities, said resilient diaphragm means being sealed throughout the periphery thereof with the work supporting member thereby providing a sealed chamber between said diaphragm means and said cavities, fluid pressure control means, conduit means communicating with said sealed chambers and with said fluid pressure control means, said work to be abraded being adapted to be supported in said openings with the inner surface thereof adjacent the diaphragm means, means for locating the effective abrading surface of the abrading tool and the adjacent surface of the work support in which said openings are formed in controlled spaced relation with each other and means for regulating the rate and extent of flow of fluid from said fluid pressure means to said chambers beneath the diaphragm means whereby said diaphragm means will exert a substantially uniform pressure of said work on said abrading tool and the rate and extent of flow of said fluid into said chambers will control the rate and extent of removal of material from said work by said abrading tool throughout a given cycle of abrasion.

3. In abrading apparatus for holding and for substantially uniformly abrading work of a given size and shape comprising a pair of spindles, one being movable toward the other, an abrading member carried by one of said spindles, a work holding member carried by the other of said spindles, means for rotating one of said members relative to the other, said work holding member having an opening therein of a size and shape larger than the size and shape of the work and having a cavity communicating with said opening and of a diameter smaller than said opening to form an inner ledge, a diaphragm of a resilient material spanning said opening in overlying relation with the cavity, a ring for sealing the periphery of said diaphragm with the work supporting member to form a sealed chamber between said diaphragm and cavity, fluid pressure control means, said ring having an inner shape and size substantially that of the shape and size of the work, conduit means connecting said sealed chamber with said fluid pressure control means, said work to be abraded being adapted to be supported in said ring, means for locating the effective abrading surface of the abrading member and the adjacent surface of the work supporting member in controlled spaced relation with each other and means for regulating the rate and extent of flow of fluid from said fluid pressure control means to said chamber beneath the diaphragm to cause said diaphragm to exert a substantially uniform pressure of said work on said abrading tool to, in turn, control the rate and extent of removal of material from said work by said abrading tool throughout a given cycle of abrasion.

4. In abrading apparatus for holding and for substantially uniformly abrading work of given size and shape comprising a pair of spindles, one being movable toward the other, an abrading member carried by one of said spindles, a work holding member carried by the other of said spindles, means for rotating one of said members relative to the other with said other member being free to rotate independently of its supporting spindle, said work holding member having a plurality of openings therein of a size and shape to receive the work to be supported therein, said openings each having a cavity communicating therewith, resilient diaphragm means spanning said openings in overlying relation with said cavities and being sealed throughout the periphery thereof with the work supporting member to provide sealed chambers between said diaphragm means and cavities, said diaphragm means, throughout its effective areas, having substantially uniform resilient characteristics, fluid pressure control means, conduit means connecting said sealed chambers with said fluid pressure control means, said work to be abraded being adapted to be supported in said openings with the inner surface thereof adjacent the diaphragm means, means for locating the effective abrading surface of the abrading tool and the adjacent surface of the work supporting member in controlled fixed spaced relation with each other and means for regulating the rate and extent of flow of fluid from said fluid pressure control means to said chambers beneath the diaphragm to cause said effective portions of said diaphragm to be expanded and to exert a substantially uniform pressure forcing said work in a direction outwardly of the openings and into engagement with the abrading tool and to, in turn, control the rate and extent of removal of material from said work by said abrading tool throughout a given cycle of abrasion.

5. In abrading apparatus for holding and abrading work, an abrading tool member having an effective abrading surface of a controlled curvature, a work supporting member having an outer surface shaped substantially to the curvature of the effective abrading surface of the abrading tool member, said work supporting member having a plurality of openings extending through said outer surface with the axes of said openings substantially radially disposed with respect to the curvature of said outer surface, said supporting member further having inner cavities communicating with said respective openings, substantially uniform resilient diaphragm means spanning said openings in overlying relation with said cavities, said diaphragm means being sealed throughout the periphery thereof with the work supporting member, fluid pressure control means, means for connecting said fluid pressure control means with said cavities for directing a fluid therein, said work to be abraded being adapted to be supported in said openings between the diaphragm and the abrading tool, with said abrading tool and said curved outer surface of the work supporting member being positioned in fixed spaced relation with each other with said space being of an amount sufficient to permit the respective pieces of work in said openings to engage the effective abrading surface of the abrading tool and with a sufficient portion of the periphery of said work lying within the openings and means for directing a fluid into said cavities beneath the diaphragm means and for regulating the rate and extent of flow of said fluid whereby the portions of the diaphragm means beneath the work will expand with a substantially uniform pressure on said respective work and will thereby control the rate and extent of removal of material from said work by said abrading tool throughout a given cycle of abrasion.

References Cited in the file of this patent

UNITED STATES PATENTS

| | | |
|---|---|---|
| 718,474 | Kasson | Jan. 13, 1903 |
| 1,408,594 | Hatcher | Mar. 7, 1922 |
| 1,455,438 | Hill | May 15, 1923 |
| 1,725,103 | Ray | Aug. 20, 1929 |
| 1,872,415 | Crowley | Aug. 16, 1932 |
| 2,395,700 | Walker | Feb. 26, 1946 |
| 2,441,108 | Turner | May 4, 1948 |
| 2,680,994 | Wood | June 15, 1954 |
| 2,688,220 | Boutell | Sept. 7, 1954 |

FOREIGN PATENTS

| | | |
|---|---|---|
| 644,750 | Great Britain | Oct. 18, 1950 |